3,177,411
APPARATUS FOR SWITCHING BETWEEN A FIXED NUMBER OF PRESET VOLTAGES FOR CONTROLLING THE SPEED OF A DRIVEN SHAFT
Arthur Ambrose Atkins and Bernard Stuart Baker, Coventry, and William Neil Jessop, Leamington Spa, England, assignors to Courtaulds Limited, London, England, a British company
Filed Jan. 5, 1961, Ser. No. 80,939
Claims priority, application Great Britain, Jan. 12, 1960, 1,038/60
4 Claims. (Cl. 318—163)

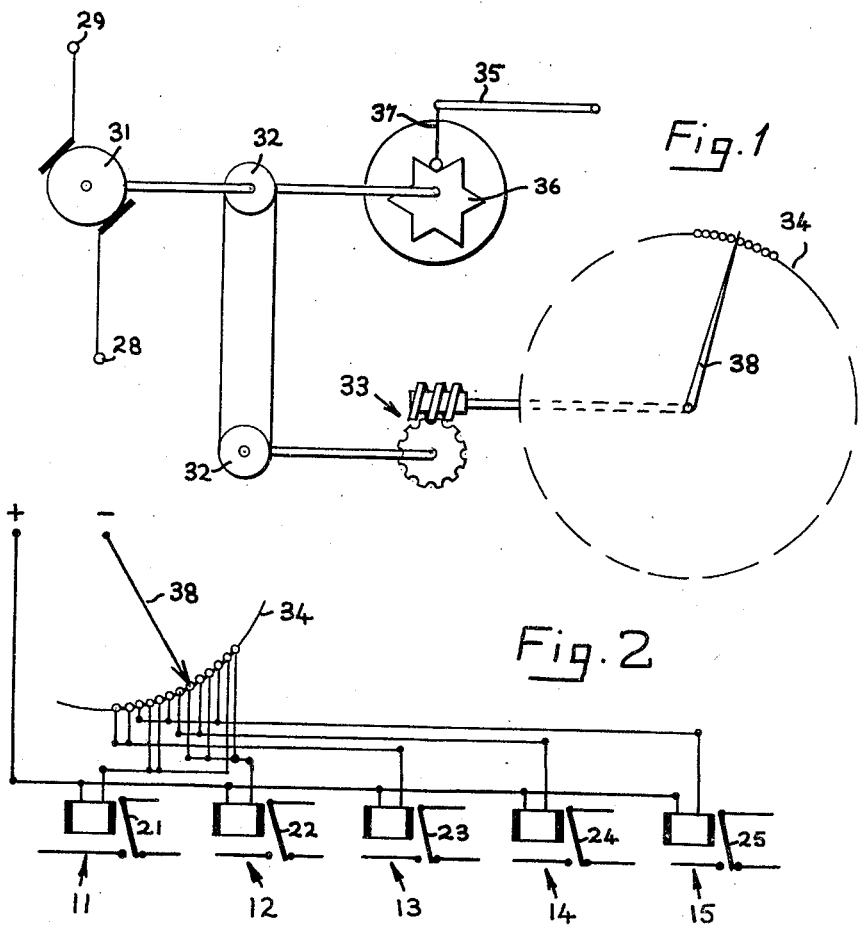
Fig.1
Fig.2
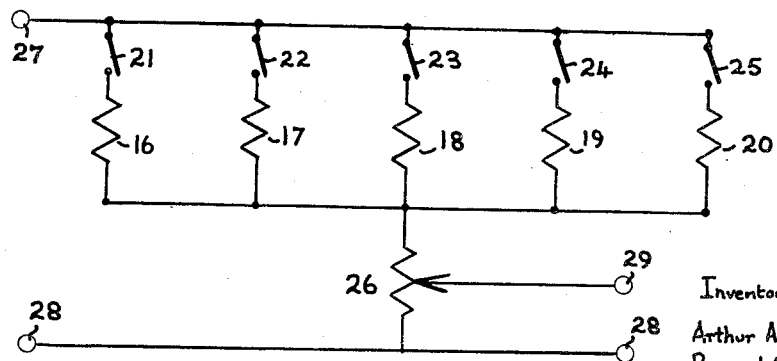
Fig.3
Inventors:-
Arthur Ambrose Atkins
Bernard Stuart Baker
William Neil Jessop
by Howson and Howson
Attorneys.

A number of industrial and other processes require that certain steps in the process should occur at irregularly spaced intervals of time. For example in the production of textile effect threads, such as slub and nep yarns, it is important that the slub or similar effect should not be repeated in such fashion that undesirable patterning appears in textile material woven or knitted from such yarns.

The present invention provides a new apparatus and method by which such happenings and particularly the production of slubs (by which we mean variations in denier) or neps in textile yarns may be controlled.

The apparatus is for switching between a fixed number of preset voltages according to a preselected random sequence having a prechosen frequency distribution of said preset voltages, said preset voltages being applied to control the speed of a variable speed driving mechanism. According to this invention an apparatus comprises a switching arrangement for switching between a number of preset voltages and a selector switch arranged to operate said preset voltage switching arrangement according to a preselected random sequence having a predetermined frequency distribution of said preset voltages.

By a variable speed driving mechanism we mean a mechanism which can drive an output shaft at varying speeds and which includes an electric motor.

The speed of the output shaft of the variable speed driving mechanism is controlled by and is proportional to the voltage (in this application referred to as the reference voltage) which is applied to the variable speed driving mechanism to control the variable speed driving mechanism's speed.

The preselected frequency distribution may be for example a rectangular, a triangular or a gaussian frequency distribution. We prefer to use a substantially rectangular frequency distribution.

For the switching arrangement we have found it convenient to use a combination of relays and contacts but many other kinds of known switching arrangements might be used. For the selector switch we have found it convenient to use a multi-way switch or a uniselector switch. Other types of selector switch would also be suitable.

The textile effect producing mechanism may be of the kind shown for example in British patent specification No. 813,857, or in our copending British application No. 4399/59 and No. 43278/59, now British Patent 899,313, corresponding to United States Patent 3,083,522.

In one industrial application of this apparatus, the variable speed driving mechanism actuates a slubbing shaft, for example a shaft which varies the rate of draw down of freshly spun filaments from a cellulose acetate spinning cell. And for this application the variable speed driving mechanism can be arranged to run for example at any one of five preset speeds. The preset speeds might conveniently be a nominal speed corresponding to the nominal slub denier of the yarn being produced, and speeds varying by —10%, —5%, +5%, +10% from the nominal speeds; these speeds will afterwards be referred to as speeds 3 (the main speed), 1, 2, 4 and 5 respectively. The apparatus is arranged so that the variable speed driving mechanism changes from one preset speed to another a large number of times, say 200, after which the cycle repeats itself. In order to avoid patterning, the order of occurrence of the speeds in the cycle must be chosen in a random sequence. This may be done very simply for example with the aid of random number tables.

A preferred arrangement in choosing the rectangular frequency distribution is for each of the five preset speeds to occur twice in each repeated group of 10, and the sequence of appearance in each group is chosen at random. Thus the order of the first 30 changes of speed in the cycle might be 33511 54242, 51224 34351, 35142 23514. All these figures are given purely by way of example and any small number of preset speeds might be chosen, which need not be evenly spaced around a nominal speed, and these speeds may be arranged in any random sequence over the cycle. But for slubbing yarns we have found that five variable speeds over a 180–200 change cycle gives adequate randomness to the slubs. One advantage of the quoted figures (i.e. speeds 3, 1, 2, 4, 5) is that, if the preset speeds never vary too much from the nominal speed, it ensures that the characteristics of the slub remain reasonably constant, since they vary with the speed of the output shaft driven by the variable speed driving mechanism. Another advantage is that too many slubs in the yarn can not occur too close together. Also excessive blank patches and bunching together of slubs in cloth made from the slub yarn is avoided by ensuring that the average speed and therefore the slub pitch does not depart greatly from the nominal speed or slub pitch over any appreciable distance. This is done by arranging that each preset speed should occur twice in every group of 10.

It has been found that even though the cycle repeats itself after 180–200 changes of speed, the actual length of the cycle ensures that no visible patterning occurs, and consequently complete randomness for which there have been many proposals, is not necessary.

The variable speed driving mechanism may be of several different kinds. It may be a variable speed motor, for example a D.C. motor which has a constant voltage applied to the field and an electronically controlled voltage applied to the armature. The electronically controlled voltage is controlled in a manner (which is well known) so that the speed of the D.C. motor is proportioned to the reference voltage applied to the variable speed driving mechanism.

The variable speed driving mechanism may comprise an A.C. motor of substantially constant speed i.e. a synchronous motor or an induction motor, coupled to a controlled slipping clutch in which the slip is controlled by an excitation current which itself is controlled electronically. The slipping clutch may be of the kind known as a Heenan-Dynamatic coupling. The excitation current is controlled in a manner (which is well known) so that the speed of the output shaft is proportioned to the reference voltage applied to the variable speed driving mechanism.

For slubbing purposes the apparatus may comprise a variable speed driving mechanism whose output shaft actuates via a cam and cam follower a slubbing shaft of the kind shown for example in British patent specification No. 813,857. The speed of the output shaft of the variable speed driving mechanism may be controlled in the manner previously described, and in order to obtain five preset speeds a mechanism is provided for changing the reference voltage to the appropriate values (i.e. five preset speeds will be needed). This may be done in several ways but one convenient way is to have a chain of resistors and to switch in extra resistors as required.

A multi-way switch is used to switch to the appropriate preset speed in accordance with the preselected random sequence. In one embodiment in which the variable speed driving mechanism is a variable speed motor and a 200-way continuously rotating switch is used, the switch is mechanically driven at 1/200 of the speed of the cam which actuates the slubbing shaft. This embodiment is shown diagrammatically in FIGURES 1 and 2 of the accompanying drawing.

In FIGURE 1 a variable-speed motor 31 drives a slubbing cam 36. 37 is the cam-follower arm which is fixed to and actuates the slubbing shaft 35. A 200-way switch 34 with a contact arm 38 is mechanically driven by the variable speed motor at 1/200 of the speed of the cam by way of a 1:1 chain drive 32 and a worm drive 33 acting as a 200:1 reduction mechanism.

The electrical connections to the 200-way switch are shown diagrammatically in FIGURE 2. Five relays 11, 12, 13, 14 and 15 control the switching-in of the five preset speeds 1, 2, 3, 4 and 5 respectively. The 200-way switch 34, has 200 positions, and each of these positions is wired to one of the five relays in accordance with the preselected random sequence. The relay connected to the position to which the arm 38 has moved, is thereby energised and the corresponding preset voltage is then applied across the terminals of the variable speed motor 31.

The manner in which each relay is used to supply its corresponding preset voltage to the terminals of the motor is shown in FIGURE 3 of the accompanying drawing. Contacts 21, 22, 23, 24 and 25 are operated by relays 11, 12, 13, 14 and 15 respectively. These contacts are normally open but when a signal is applied to a particular relay, the contacts associated with that relay close. The main supply voltage is applied between terminals 27 and 28, while the reference voltage applied to control the motor 31 appears between terminals 29 and 28. The values of the resistors 16, 17, 18, 19 and 20 are chosen to give the desired preset voltages and therefore the desired preset speeds of the motor 31.

Suitable precautions must be taken to prevent more than one relay being operated at one time. For example, it is arranged that when relay 11 is activated, normally closed contacts wired in series with each of the relay coils in relays 12 to 15, are opened, and likewise for each of the other relays.

Other types of multi-way switches such as a uniselector switch can also be used in known manner to produce the required variation in the reference voltage.

The apparatus may be used for any pattern breaking mechanism when a controlled change of speed is needed, such as for the production of normal slubs, fancy effects or cheese winding traverse drive.

What we claim is:

1. Apparatus for controlling the speed of a driven shaft comprising a selector switch, a plurality of voltage control switches, means causing operation of said control switches independently of each other responsive to operations of said selector switch, electro-responsive translating means having a shaft driven at different speeds in response to different voltages, and means causing different voltages to be applied to said translating means in any desired sequence and amount responsive to operation of said voltage control switches.

2. Apparatus as claimed in claim 1 in which the translating means is a variable speed motor.

3. Apparatus as claimed in claim 1 in which the translating means includes a constant speed motor and a slipping clutch, and means to control the slipping of the clutch, thereby to vary the speed of said driven shaft.

4. In combination with apparatus for producing textile effects by varying the operations of an effect-producing member, the apparatus comprising a selector switch, a plurality of voltage control switches, means causing operation of said control switches independently of each other responsive to operations of said selector switch, electro-responsive translating means having an effect-producing member whose operations are variable in response to different voltages and means causing different voltages to be applied to said translating means in any desired sequence and amount responsive to operation of said voltage control switches.

References Cited in the file of this patent
UNITED STATES PATENTS

| | | |
|---|---|---|
| 1,801,657 | Buyko | Apr. 21, 1931 |
| 2,487,066 | Moen | Nov. 8, 1949 |
| 2,627,593 | Tietig | Feb. 3, 1953 |
| 2,752,557 | Moerkens et al. | June 26, 1956 |